US008799465B2

(12) United States Patent
Lake

(10) Patent No.: US 8,799,465 B2
(45) Date of Patent: Aug. 5, 2014

(54) FAKE WEB ADDRESSES AND HYPERLINKS

(75) Inventor: John Michael Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1232 days.

(21) Appl. No.: 10/964,342

(22) Filed: Oct. 13, 2004

(65) Prior Publication Data

US 2006/0080437 A1     Apr. 13, 2006

(51) Int. Cl.
*G06F 15/173* (2006.01)
*G06F 11/00* (2006.01)

(52) U.S. Cl.
USPC ............................................ 709/225; 726/22

(58) Field of Classification Search
USPC .................... 709/225, 227; 726/22
See application file for complete search history.

(56) References Cited

U.S. PATENT DOCUMENTS

| | | | | |
|---|---|---|---|---|
| 6,286,046 | B1 | 9/2001 | Bryant | 709/224 |
| 6,332,158 | B1* | 12/2001 | Risley et al. | 709/219 |
| 6,516,416 | B2 | 2/2003 | Gregg et al. | 713/201 |
| 6,917,612 | B2* | 7/2005 | Foti et al. | 370/352 |
| 2003/0172301 | A1* | 9/2003 | Judge et al. | 713/201 |
| 2003/0208697 | A1 | 11/2003 | Gardner | 713/202 |
| 2004/0139049 | A1* | 7/2004 | Hancock et al. | 707/1 |
| 2005/0076222 | A1* | 4/2005 | Olkin et al. | 713/176 |
| 2005/0183142 | A1* | 8/2005 | Podanoffsky | 726/18 |
| 2005/0257261 | A1* | 11/2005 | Shraim et al. | 726/22 |
| 2006/0021031 | A1* | 1/2006 | Leahy et al. | 726/22 |

FOREIGN PATENT DOCUMENTS

| | | |
|---|---|---|
| JP | 2003-163701 | 6/2003 |
| WO | WO02/084512 A1 | 10/2002 |

OTHER PUBLICATIONS

Chou, Neil et al, "Client-side defense against web-based identity theft", Feb. 2004, 11th Annual Network and Distributed System Security Symposium (NDSS '04), pp. 1-16.*

* cited by examiner

*Primary Examiner* — Brian J Gillis
(74) *Attorney, Agent, or Firm* — Steven M. Greenberg, Esq.; CRGO Law

(57) ABSTRACT

A destination address is processed to determine if the destination address is a fake web address or hyperlink. The destination address may be compared with a database of known domain names to see if the domain name is legitimate or illegitimate. The designation address may also be compared to other domain names to see if it is an honest or dishonest transformation of the other domain names. Appropriate action may be taken if the designation address is a dishonest transformation of another domain name.

57 Claims, 3 Drawing Sheets

FAKE WEB ADDRESSES AND HYPERLINKS

BACKGROUND OF THE INVENTION

This invention relates to web addresses and hyperlinks, and more particularly, to a method for detecting fake web addresses and hyperlinks.

A hyperlink is an element in an electronic document that links to another place in the same document or to an entirely different document. The hyperlink may be within any electronic document, such as a web page, an email, a word processing document, a spreadsheet or the like. With respect to the Internet, the hyperlink may be a network address or domain name of a web site that may be embedded in an object, such as a word, phrase, icon or picture. These objects are commonly known as hyperlinked objects.

Web pages and other resources on the World Wide Web are identified by unique URLs (Uniform Resource Locator) or addresses. The network address or IP address is an identifier for a computer or device on a TCP/IP network. Networks using the TCP/IP protocol route messages based on the IP address of the destination. The format of an IP address is a 32-bit numeric address written as four numbers separated by periods. Each number can be zero to 255. For example, 1.160.10.240 could be an IP address.

A domain name is a name that identifies one or more IP addresses. For example, the domain name <ibm.com> may have one or more IP addresses associated with it. Every domain name has a suffix that indicates the top level domain (TLD) to which it is associated (e.g., .com, .org or .net). The Internet functions based on the IP address and not domain name such that a Domain Name System (DNS) server is needed to translate domain names into IP addresses.

Once a hyperlinked object is activated, an Internet relationship may be established by a Web browser or the like. The hyperlinked object itself may be the symbol representing the web site, the name of the web site, the domain name of the web site or any desired representation. For example, the hyperlinked object for IBM's web site may be the IBM symbol, the name IBM or the domain name <www.ibm.com>.

An Internet user may be sent to a fake web site through the use of fake hyperlinks. For example, a hyperlinked object may display the name <www.ibm.com> while the domain name associated with the object is actually <www.1bm.com> with the number "1" used in place of the letter "i". The HTML syntax for such a fake hyperlink may be:

<a href-http://www.1bm.com/>www.ibm.com</a>.

The hyperlink appears as www.ibm.com while the domain name is actually http://www.1bm.com. As the number "1" is similar in appearance to the letter "i", the unsuspecting user may not realize that they are being routed to a fake web site instead of the actual web site. The fake web site could be a doctored version of the actual web site that is used to gather and exploit the user's sensitive information. This activity is known as phishing.

BRIEF SUMMARY OF THE INVENTION

According to one aspect of the present invention, a method of processing a destination address comprises determining if the destination address is a valid address by comparing the destination address with at least one known destination address, and performing a first function in response to the determination.

According to another aspect of the present invention, a method of registering a domain name comprises comparing the domain name with a plurality of known names, determining if the domain name is a dishonest transformation of any of the plurality of known names, and allowing the domain name to be registered if the domain name is not a dishonest transformation of any of the plurality of known names.

According to yet another aspect of the present invention, a method of identifying dishonest domain name transformations comprises comparing a domain name with at least one known name, and determining if the domain name comprises visual confusion with the at least one known name.

According to further aspect of the present invention, a computer program product for processing destination addresses comprises a computer readable medium having computer readable program code embodied therein. The computer readable program code comprises computer readable program code configured to determine if the destination address is a valid address by comparing the destination address with at least one known destination address and computer readable program code configured to perform a first function in response to the determination.

According to a still further aspect of the present invention, a computer program product for registering a domain name comprises a computer readable medium having computer readable program code embodied therein. The computer readable program code comprises computer readable program code configured to compare the domain name with a plurality of known names, computer readable program code configured to determine if the domain name is a dishonest transformation of any of the plurality of known names, and computer readable program code configured to allow the domain name to be registered if the domain name is not a dishonest transformation of any of the plurality of known names.

According to another aspect of the present invention, a computer program product for identifying dishonest domain name transformations comprises a computer readable medium having computer readable program code embodied therein. The computer readable program code comprises computer readable program code configured to compare a domain name with at least one known name and computer readable program code configured to determine if the domain name comprises visual confusion with the at least one known name.

According to yet another aspect of the present invention, a system comprises a first module configured to determine if a destination address is a valid address by comparing the destination address with at least one known destination address and a second module configured to perform a first function in response to the determination.

According to a further aspect of the present invention, a system for registering a domain name comprises a first module to compare a domain name with a plurality of known names and to determine if the domain name is a dishonest transformation of any of the plurality of known names and a second module to allow the domain name to be registered if the domain name is not a dishonest transformation of any of the plurality of known names.

According to a still further aspect of the present invention, a system for identifying dishonest domain name transformations comprises a first module configured to compare a domain name with at least one known name and determine if the domain name comprises visual confusion with the at least one known name.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
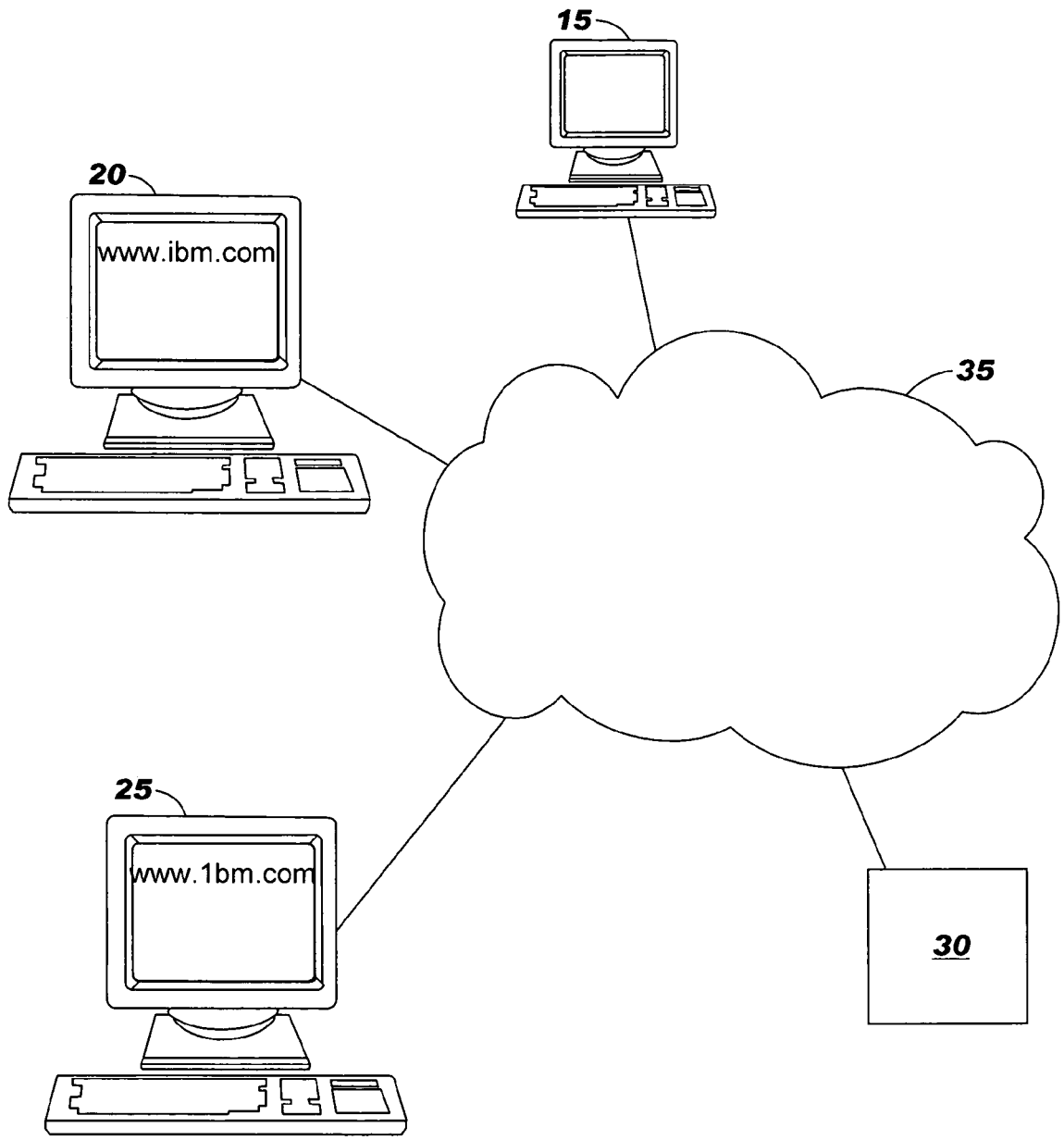
FIG. 1 illustrates a computing system that may be used with the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, a computing system 10 that may be used to process a designation address is illustrated. Computing system 10 comprises a plurality of computing devices 15, 20, 25 and a domain name server 30 coupled together through a network 35. The computing device 15 may comprise any of number of computing devices, such as a personal computer, a mobile phone, a Personal Digital Assistant (PDA) or the like. The computing devices 20, 25 may comprises any of a number of computing devices, such as a personal computer that hosts a web site. In the illustrated embodiment, computing device 20 hosts legitimate web site <www.ibm.com> while computing device 25 hosts the illegitimate web site <www.1bm.com>. The network 35 may include any networking system including a local area network, wide area network, intranet or the Internet. It will be appreciated by those skilled the art that the system 10 may include a number of different computing devices, additional web servers, domain name servers and other devices as appropriate. In addition, the network 35 may include one or more networks coupled together as appropriate.

According to one aspect of the present invention, the computing device 15 includes a browser program to access the web sites hosted by computing devices 20, 25. A hyperlink to be processed may be within any electronic document, such as a web page, an email, a word processing document, a spreadsheet or the like. With respect to the Internet, the hyperlink may include a destination address, such as a numerical IP address or a domain name of a web site that may be embedded in an object, such as a word, phrase, icon or picture. In one aspect of the present invention, the destination address may be a domain name of a web site (e.g., <www.ibm.com>) hosted by computing device 20. The destination address is processed to determine if the domain name is an honest or dishonest transformation of a legitimate domain name.

The destination address may be compared to a list of legitimate domain names, a list of illegitimate domain names or a combination of the two. For example, the list of illegitimate domain names may contain the entry <www.1bm.com> which could be a known illegitimate name as the letter "i" has been replaced with the number "1." In addition, the list of legitimate domain names may contain the entry <ibm.com> which could be a known legitimate site as the "www" was simply dropped from the name. Determining what constitutes an honest or dishonest transformation, and thus, whether a domain name may be legitimate or illegitimate will be described below.

In accordance with one aspect of the present invention, the domain name is compared to legitimate domain names to determine if there has been a dishonest transformation using visual confusion. One type of visual confusion is alphanumeric to alphanumeric substitutions. For example, the number "1" looks very similar to the letter "i" such that the replacement of one with the other may constitute a dishonest transformation. Assuming that the hyperlink <www.1bm.com> is compared with the known domain name <www.ibm.com>, the substitution of "1" with "i" may be an indication of a dishonest transformation. The following substitutions may also be used to cause visual confusion resulting in a probable dishonest transformation of the hyperlink and known domain name: the letter L with the number one, the number one with the letter L, the letter O with the number zero, the number zero with the letter O, the letter o with the number zero, the number zero with the letter o, the letter B with the number eight, the number eight with the letter B, the letter S with the number eight, the number eight with the letter S, the letter E with the number eight, the number eight with the letter E, the letter E with the number three, the number three with the letter E, the letter F with the number seven, the number seven with the letter F, the letter I with number one, the number one with the letter I, the letter m with the letter n and the letter n with the letter m. It will be appreciated by those skilled in the art that other alphanumeric to alphanumeric substitutions may be used to create visual confusion.

Another form of visual confusion that may be checked is the substitution of the top level domain. For example, .org may be substituted for .com, .gov may be substituted for .com and any country designation may be used to create a dishonest transformation through visual confusion.

According to another aspect of the present invention, the similarity between the domain name and list of legitimate domain names may be determined. A "common subsequence" is a sequence of characters occurring in the same order in two strings. For example, the strings "academic" and "abcdefghijklm" have many common subsequences, including:
a, c, d, e, m, i,
ac, ad, ae, am, ai
cd, ce, cm, ci
acdem, acdei.
The last two subsequences enjoy the special distinction of being the longest common subsequences (LCS). Note that a common subsequence may have multiple instances (e.g., "ad" can be from AcaD or acAD).

The similarity M between two strings and the variable P that names the sets of pairs between the two strings may be computed as follows. Given two strings s and t with s representing the domain name to be processed and t representing a known legitimate domain name:
M=similarity(s, t), and
P=xform(s, t)={($s_i$, $t_i$): 0<=i<=k} where $$s = s_0 + s_1 + \ldots + s_k$$

and $$t = t_0 + t_1 + \ldots + t_k$$

subject to the constraint that if $$u = u_0 + u_1 + \ldots + u_M$$

is a longest common subsequence of s and t, then u may be constructed by selecting $$u_m = s_i = t_j$$

such that if $u_m = s_i = t_j$ and $u_{m-1} = s_x = t_y$, then x<i and t<j for all m, i, j, x and y. In short, u selects common substrings of s and t in order. (Note that some of the $s_i$ and $t_j$ may be "empty strings" of length zero, and that these would not be considered part of the LCS.)

While P may be considered to be a single set, all of the solutions may be considered as:
simifoirm(s, t)=<M, {P}>.
A similarity threshold N may be calculated that represents the similarity between two strings and thus whether a transformation is honest or dishonest. The similarity threshold may be calculated as follows:
N=LCS(s,t)/min(length(s),length(t)) where:
LCS (s,t) is the longest common subsequence of strings s and t;
min(length(s),length(t)) is the minimum character length of s and t.
For illustrative purposes, assume:
s=www.ibm.com
t=www.1bm.com.
The set of pairs between s and t is:
P={("www.", "www."), ("i", "1"), ("bm.com", "bm.com")}.
The longest common subsequence of s and t is thus 10 and the minimum character length is 11. The similarity threshold N is thus 10/11. Expressed as a percentage, the similarity threshold N is 90.9%. Except for a similarity threshold of 100% which is indication of a perfect match, the greater the similarity threshold, the greater the likelihood that the transformation is a dishonest transformation such that in the illustrated example, the transformation is probabilistically dishonest. The similarity threshold may be compared to a predetermined threshold value to determine if a transformation is to be considered honest or dishonest. For higher security, the threshold may be set lower (e.g., 70%) while for lower security the threshold may be set higher (e.g. 90%). It will be appreciated by those skilled in the art that the threshold value may be set to any desired number. It will be further appreciated by those skilled in the art that the similarity threshold may be calculated using any appropriate formula.

According to another aspect of the present invention, the user may be presented with a hyperlink that includes display text with the domain name. Typically, the display text matches the domain name. However, the display text may be a transformation of the domain name, and thus, an honest or dishonest transformation that may be resolved. The display name may be compared with the domain name to determine if there has been a transformation and whether it is honest or dishonest. The HTML syntax for such a hyperlink may be:
<a href="http://www.1bm.com/">www.ibm.com</a>.
The hyperlink appears as <www.ibm.com> while the domain name is actually <www.1bm.com>. The displayed name <www.ibm.com> is compared with the domain name <www.1bm.com> and as the substitution of the number "1" for the letter "i" is a form of visual confusion, the transformation may be dishonest and the hyperlink may be fake.

In addition to or separate to the above, the domain name server 30 may be accessed to determine the IP address(es) associated with the domain name and the known domain or display text. The resulting IP addresses may be compared with one another to determine if there is any overlap between the IP addresses. As domain names may have one or more IP addresses associated with it, if there is any overlap between the IP addresses, the domain name to be processed is likely to be an honest transformation of the known domain name or display text. For example, the IP address associated with domain name <ibm.com> may fall within the set of IP addresses associated with <www.ibm.com> suggesting that the transformation is honest and the domain name is legitimate. Conversely, the IP address associated with <www.1bm.com> may not fall within the set of IP addresses associated with <www.ibm.com> suggesting that the transformation is dishonest and the domain name is illegitimate.

According to another aspect of the present invention, the designation address may be an IP address associated with a domain name. The IP address may be compared to a list of legitimate IP addresses, a list of illegitimate IP addresses or a combination of the two. In addition, the domain name server 30 may be accessed to determine the domain name associated with the IP address. The domain name may then be analyzed as described herein.

If the transformation is part of the database of legitimate transformations or is an honest transformation, the user may be allowed to access the web site associated with the domain name in question. However, if the transformation is part of the database of illegitimate transformations or is a dishonest transformation, the user may be alerted, the user may not be able to access the web site associated with the domain or the user may have to explicitly grant permission to allow the web site to be accessed. It will be appreciated by those skilled in the art that other actions may be taken as appropriate.

The lists of legitimate domain names may reside locally on the user's computer or remotely on a server, another computer or any other device separate from the user's computer. The lists may be populated as the user checks different hyperlinks in the same way a word processing dictionary is populated. As will be appreciated by those skilled in the art, the lists may also contain known legitimate and/or illegitimate addresses.

It will be appreciated by those skilled in the art that the present invention may also be utilized to determine the acceptability of domain registrations. As part of the registration process, the domain name to be registered will be compared to a list of known registrations to ensure that the domain name sought to be registered is not a duplicate of a domain name already registered. In addition, the domain name sought to be registered may be compared to a list of known honest and/or dishonest transformations. The domain name sought to be registered may also be compared to a database of trademarks or other appropriate names to determine if the domain name is an honest or dishonest transformation of any of the trademarks or other appropriate names. Assuming the domain name has not already been registered, the domain name registration may be allowed to continue if the domain name is part of a database of known honest transformations or determined to be an honest transformation or the process may be terminated if the domain name is part of a database of known dishonest transformations or determined to be a dishonest transformation. It will be appreciated by those skilled in the art that other actions may be taken as appropriate, such as notifying the owner of any domain name which is subject to the registration of domain name that may be a dishonest transformation of such owner. The syntax for such a process may be carried out as follows where n is the domain name sought to be registered, D is the database of domain names, trademarks or other appropriate names:

```
if (n is an element of D) {
    fail( n already in use );
} else {
    for each z in D {
        P = xform(z, n);
        H := true;
        for i := 0 to k do
            H &= honest(zi,ni);
        if (H == false) {
            fail( n derivable from z by dishonest transformation );
        }
    }
}
```

Figure 2:
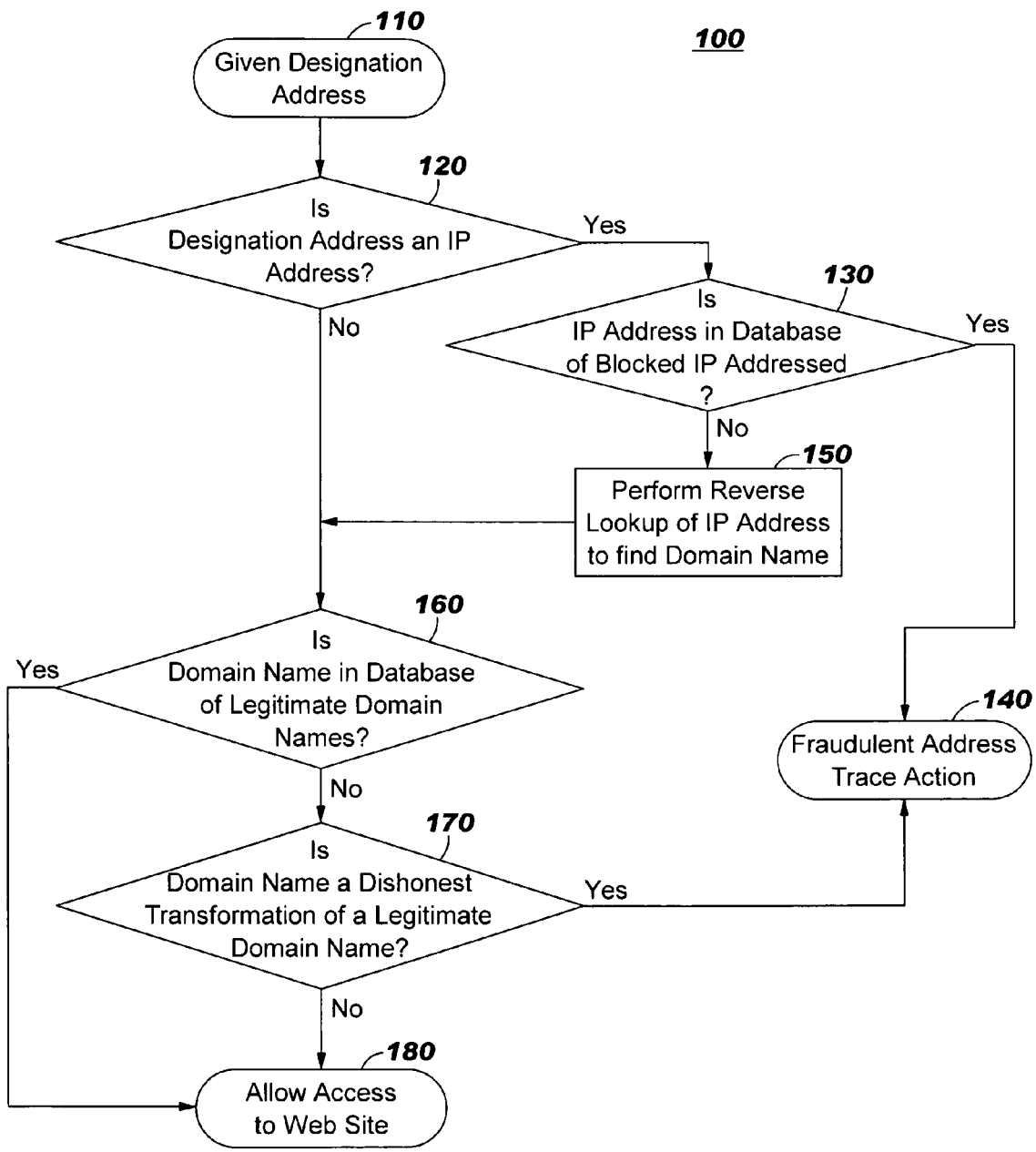
FIG. 2 illustrates a method of processing a designation address according to one aspect of the present invention.

Referring now to FIG. 2, a method 100 of processing a designation address is illustrated. In block 110, a designation address to be processed is presented. In block 120, the designation address is analyzed to determine if the designation address is a domain name or IP address. If the designation address is an IP address, then in block 130 the designation address is analyzed to determine if it is included in a database of blocked IP addresses or a range of blocked IP addresses. If the designation address is included in such a database, then the designation address is considered to be a fraudulent address and appropriate action is taken in block 140. Otherwise, the domain name associated with the designation address is determined, as illustrated in block 150, and the process continues at block 160 along with domain name type designation addresses from block 120.

In block 160, the domain name is compared with a database of legitimate domain names. If the domain name matches an entry in the database, then the user will be allowed to access the web site in block 170. If the domain name does not match an entry in the database, the domain name is analyzed in block 180 to determine if it is a dishonest transformation of a legitimate domain name. If the transformation is dishonest then the designation address is considered to be a fraudulent address and appropriate action is taken in block 140. If the transformation is deemed to be honest then the user will be allowed to access the web site in block 170.

Figure 3:
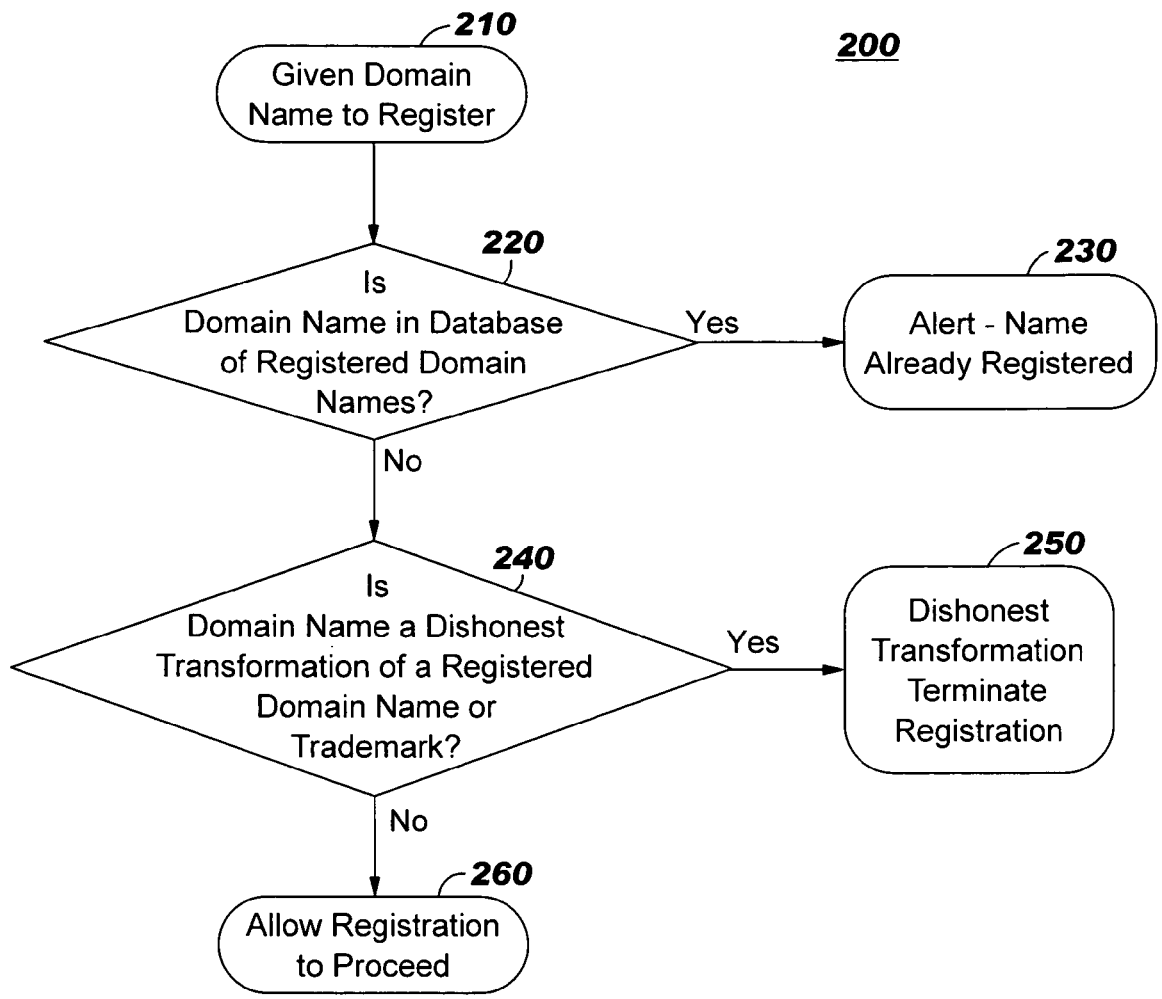
FIG. 3 illustrates a method of detecting illegitimate domain names during domain registration according to another aspect of the present invention.

Referring now to FIG. 3, a method 200 of detecting illegitimate domain names during domain registration is illustrated. In block 210, a domain name to be registered is presented. In block 220, the domain name is compared to a database of registered domain names to determine if the domain name in question has already been registered. If the domain name has already been registered, then the user is notified that the domain name is not available for registration in block 230. If the domain has not already been registered then the domain name is analyzed to determine if it is a dishonest transformation of a registered domain name or trademark in block 240. If the transformation is dishonest then the registration is terminated in block 250. If the transformation is honest then the registration process is allowed to continue in block 260.

The flowchart and block diagrams of FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

What is claimed is:

1. A computer-implemented method of processing a destination address, the method comprising:
   receiving, within a computer hardware device, the destination address;
   determining that the destination address is a domain name;
   comparing the domain name with a database of legitimate domain names;
   determining that the domain name does not match an entry in the database of legitimate domain names;
   analyzing the domain name to determine that the domain name is a dishonest transformation of a legitimate domain name by determining a similarity value between the domain name and the legitimate domain name exceeds a predetermined value, the similarity value being based upon a longest common subsequence between the domain name and the legitimate domain name;
   classifying the destination address as a fraudulent address; and
   taking an appropriate action in response to classifying the destination address as a fraudulent address.

2. The method of claim 1, wherein
   the appropriate action includes at least one of
      issuing a warning, and
      blocking access to the destination address.

3. The method of claim 1, further comprising
   determining if the domain name is one of a plurality of known illegitimate domain names; and
   upon determining that the domain name is one of the plurality of known illegitimate domain names, classifying the destination address as a fraudulent address.

4. The method of claim 1, wherein
   the dishonest transformation comprises visual confusion.

5. The method of claim 4, wherein
   the visual confusion comprises alphanumeric to alphanumeric visual confusion.

6. The method of claim 4, wherein
   the visual confusion comprises at least one of a substitution of
      the letter L with the number one, the number one with the letter L,
      the letter O with the number zero, the number zero with the letter O,
      the letter o with the number zero, the number zero with the letter o,
      the letter B with the number eight, the number eight with the letter B,
      the letter S with the number eight, the number eight with the letter S,
      the letter E with the number eight, the number eight with the letter E,
      the letter E with the number three, the number three with the letter E,
      the letter F with the number seven, the number seven with the letter F,
      the letter I with number one, the number one with the letter I,
      the letter i with the number 1, the number 1 with the letter i,
      the letter m with the letter n, and the letter n with the letter m.

7. The method of claim 1, wherein
   the dishonest transformation comprises a substitution of a top-level domain of the legitimate domain name.

8. The method of claim 1, further comprising
   comparing the destination address of a hyperlink with display text of the hyperlink.

9. The method of claim 8, wherein
   the destination address is classified as dishonest transformation upon the destination address of the hyperlink being a dishonest transformation of the display text.

10. The method of claim 9, wherein
    the dishonest transformation comprises visual confusion.

11. The method of claim 9, wherein
    the dishonest transformation comprises a substitution of a top-level domain of the destination address of the hyperlink.

12. The method of claim 9, wherein
    the destination address of the hyperlink is a dishonest transformation of the display text upon a similarity value between the destination address of the hyperlink and the display text exceeding a predetermined value.

13. The method of claim 12, wherein
    the similarity value is based upon a longest common subsequence between the destination address of the hyperlink and the display text.

14. A computer-readable memory having stored thereon computer-readable program instructions for processing a destination address, the computer-readable program instructions, upon being executed by a computer, causing the computer to perform the operations comprising:
    receiving the destination address;
    determining that the destination address is a domain name;
    comparing the domain name with a database of legitimate domain names;
    determining that the domain name does not match an entry in the database of legitimate domain names;
    analyzing the domain name to determine that the domain name is a dishonest transformation of a legitimate domain name by determining a similarity value between the domain name and the legitimate domain name exceeds a predetermined value, the similarity value being based upon a longest common subsequence between the domain name and the legitimate domain name;
    classifying the destination address as a fraudulent address; and
    taking an appropriate action in response to classifying the destination address as a fraudulent address.

15. The computer-readable memory of claim 14, wherein the appropriate action includes at least one of
 issuing a warning, and
 blocking access to the destination address.

16. The computer-readable memory of claim 14, further comprising
 determining if the domain name is one of a plurality of known illegitimate domain names; and
 upon determining that the domain name is one of the plurality of known illegitimate domain names, classifying the destination address as a fraudulent address.

17. The computer-readable memory of claim 14, wherein the dishonest transformation comprises visual confusion.

18. The computer-readable memory of claim 17, wherein the visual confusion comprises alphanumeric to alphanumeric visual confusion.

19. The computer-readable memory of claim 17, wherein the visual confusion comprises at least one of a substitution of
 the letter L with the number one, the number one with the letter L,
 the letter O with the number zero, the number zero with the letter O,
 the letter o with the number zero, the number zero with the letter o,
 the letter B with the number eight, the number eight with the letter B,
 the letter S with the number eight, the number eight with the letter S,
 the letter E with the number eight, the number eight with the letter E,
 the letter E with the number three, the number three with the letter E,
 the letter F with the number seven, the number seven with the letter F,
 the letter I with number one, the number one with the letter I,
 the letter i with the number 1, the number 1 with the letter i,
 the letter m with the letter n, and the letter n with the letter m.

20. The computer-readable memory of claim 14, wherein the dishonest transformation comprises a substitution of a top-level domain of the legitimate domain name.

21. The computer-readable memory of claim 14, further comprising
 comparing the destination address of a hyperlink with display text of the hyperlink.

22. The computer-readable memory of claim 21, wherein the destination address is classified as a dishonest transformation upon the destination address of the hyperlink being a dishonest transformation of the display text.

23. The computer-readable memory of claim 22, wherein the dishonest transformation comprises visual confusion.

24. The computer-readable memory of claim 22, wherein the dishonest transformation comprises a substitution of a top-level domain of the destination address of the hyperlink.

25. The computer-readable memory of claim 22, wherein the destination address of the hyperlink is a dishonest transformation of the display text upon a similarity value between the destination address of the hyperlink and the display text exceeding a predetermined value.

26. The computer-readable memory of claim 25, wherein the similarity value is based upon a longest common subsequence between the destination address of the hyperlink and the display text.

27. A computer hardware device for processing a destination address, comprising a processor configured to perform the following steps:
 receiving the destination address;
 determining that the destination address is a domain name;
 comparing the domain name with a database of legitimate domain names;
 determining that the domain name does not match an entry in the database of legitimate domain names;
 analyzing the domain name to determine that the domain name is a dishonest transformation of a legitimate domain name by determining a similarity value between the domain name and the legitimate domain name exceeds a predetermined value, the similarity value being based upon a longest common subsequence between the domain name and the legitimate domain name;
 classifying the destination address as a fraudulent address; and
 taking an appropriate action in response to classifying the destination address as a fraudulent address.

28. The computer hardware device of claim 27, wherein the appropriate action includes at least one of
 issuing a warning, and
 blocking access to the destination address.

29. The computer hardware device of claim 27, wherein the processor is further configured to perform the steps comprising
 determining if the domain name is one of a plurality of known illegitimate domain names; and
 upon determining that the domain name is one of the plurality of known illegitimate domain names, classifying the destination address as a fraudulent address.

30. The computer hardware device of claim 27, wherein the dishonest transformation comprises visual confusion.

31. The computer hardware device of claim 30, wherein the visual confusion comprises alphanumeric to alphanumeric visual confusion.

32. The computer hardware device of claim 30, wherein the visual confusion comprises at least one of a substitution of
 the letter L with the number one, the number one with the letter L,
 the letter O with the number zero, the number zero with the letter O,
 the letter o with the number zero, the number zero with the letter o,
 the letter B with the number eight, the number eight with the letter B,
 the letter S with the number eight, the number eight with the letter S,
 the letter E with the number eight, the number eight with the letter E,
 the letter E with the number three, the number three with the letter E,
 the letter F with the number seven, the number seven with the letter F,
 the letter I with number one, the number one with the letter I,
 the letter i with the number 1, the number 1 with the letter i,
 the letter m with the letter n, and the letter n with the letter m.

33. The computer hardware device of claim 27, wherein the dishonest transformation comprises a substitution of a top-level domain of the legitimate domain name.

34. The computer hardware device of claim 27, wherein comparing the destination address of a hyperlink with display text of the hyperlink.

35. The computer hardware device of claim 34, wherein the destination address is classified as a dishonest transformation upon the destination address of the hyperlink being a dishonest transformation of the display text.

36. The computer hardware device of claim 35, wherein the dishonest transformation comprises visual confusion.

37. The computer hardware device of claim 35, wherein the processor is further configured to perform the step of
the dishonest transformation comprises a substitution of a top-level domain of the destination address of the hyperlink.

38. The computer hardware device of claim 35, wherein the destination address of the hyperlink is a dishonest transformation of the display text upon a similarity value between the destination address of the hyperlink and the display text exceeding a predetermined value.

39. The computer hardware device of claim 38, wherein the similarity value is based upon a longest common subsequence between the destination address of the hyperlink and the display text.

40. A computer-implemented method of processing a domain name to be registered, the method comprising:
receiving, within a computer hardware device, the domain name;
comparing the domain name with a database of registered domain names to that the domain name has not already been registered;
analyzing the domain name to determine that the domain name is a dishonest transformation of a registered domain name by determining a similarity value between the domain name and the registered domain name exceeds a predetermined value, the similarity value being based upon a longest common subsequence between the domain name and the registered domain name; and
disallowing the domain name from being registered.

41. The method of claim 40, wherein
the database of registered domain names includes a database of trademarks and service marks.

42. The method of claim 40, wherein
the dishonest transformation comprises visual confusion.

43. The method of claim 42, wherein
the visual confusion comprises alphanumeric to alphanumeric visual confusion.

44. The method of claim 42, wherein
the visual confusion comprises at least one of a substitution of
the letter L with the number one, the number one with the letter L,
the letter O with the number zero, the number zero with the letter O,
the letter o with the number zero, the number zero with the letter o,
the letter B with the number eight, the number eight with the letter B,
the letter S with the number eight, the number eight with the letter S,
the letter E with the number eight, the number eight with the letter E,
the letter E with the number three, the number three with the letter E,
the letter F with the number seven, the number seven with the letter F,
the letter I with number one, the number one with the letter I,
the letter i with the number 1, the number 1 with the letter i,
the letter m with the letter n, and the letter n with the letter m.

45. The method of claim 42, wherein
the dishonest transformation comprises a substitution of a top-level domain of the legitimate domain name.

46. A computer-readable memory having stored thereon computer-readable program instructions for processing a domain name to be registered, the computer-readable program instructions, upon being executed by a computer, causing the computer to perform the operations comprising
receiving the domain name;
comparing the domain name with a database of registered domain names to determine that the domain name has not already been registered;
analyzing the domain name to determine that the domain name is a dishonest transformation of a registered domain name by determining a similarity value between the domain name and the registered domain name exceeds a predetermined value, the similarity value being based upon a longest common subsequence between the domain name and the registered domain name; and
disallowing the domain name from being registered.

47. The computer-readable memory of claim 46, wherein the database of registered domain names includes a database of trademarks and service marks.

48. The computer-readable memory of claim 46, wherein the dishonest transformation comprises visual confusion.

49. The computer-readable memory of claim 48, wherein the visual confusion comprises alphanumeric to alphanumeric visual confusion.

50. The computer-readable memory of claim 48, wherein the visual confusion comprises at least one of a substitution of
the letter L with the number one, the number one with the letter L,
the letter O with the number zero, the number zero with the letter O,
the letter o with the number zero, the number zero with the letter o,
the letter B with the number eight, the number eight with the letter B,
the letter S with the number eight, the number eight with the letter S,
the letter E with the number eight, the number eight with the letter E,
the letter E with the number three, the number three with the letter E,
the letter F with the number seven, the number seven with the letter F,
the letter I with number one, the number one with the letter I,
the letter i with the number 1, the number 1 with the letter i,
the letter m with the letter n, and the letter n with the letter m.

51. The computer-readable memory of claim 46, wherein
the dishonest transformation comprises a substitution of a top-level domain of the legitimate domain name.

52. A computer hardware device for processing a domain name to be registered, comprising a processor configured to perform the following steps:
receiving the domain name;
comparing the domain name with a database of registered domain names to determine that the domain name has not already been registered;
analyzing the domain name to determine that the domain name is a dishonest transformation of a registered domain name by determining a similarity value between the domain name and the registered domain name exceeds a predetermined value, the similarity value being based upon a longest common subsequence between the domain name and the registered domain name; and
disallowing the domain name from being registered.

53. The computer hardware device of claim 52, wherein the database of registered domain names includes a database of trademarks and service marks.

54. The computer hardware device of claim 52, wherein the dishonest transformation comprises visual confusion.

55. The computer hardware device of claim 54, wherein the visual confusion comprises alphanumeric to alphanumeric visual confusion.

56. The computer hardware device of claim 54, wherein the visual confusion comprises at least one of a substitution of
the letter L with the number one, the number one with the letter L,
the letter O with the number zero, the number zero with the letter O,
the letter o with the number zero, the number zero with the letter o,
the letter B with the number eight, the number eight with the letter B,
the letter S with the number eight, the number eight with the letter S,
the letter E with the number eight, the number eight with the letter E,
the letter E with the number three, the number three with the letter E,
the letter F with the number seven, the number seven with the letter F,
the letter I with number one, the number one with the letter I,
the letter i with the number 1, the number 1 with the letter i,
the letter m with the letter n, and the letter n with the letter m.

57. The computer hardware device of claim 52, wherein the dishonest transformation comprises a substitution of a top-level domain of the legitimate domain name.

* * * * *